(12) United States Patent  
Mokhbery et al.

(10) Patent No.: US 9,267,856 B2  
(45) Date of Patent: Feb. 23, 2016

(54) LOAD AND TORQUE SENSING SYSTEMS UTILIZING MAGNETIC KEY FOR MECHANICAL ENGAGEMENT

(71) Applicant: FUTEK ADVANCED SENSOR TECHNOLOGY, INC., Irvine, CA (US)

(72) Inventors: Javad Mokhbery, Laguna Niguel, CA (US); Amirreza Mehran, Laguna Niguel, CA (US); Gary Barrett, Commerce Township, CA (US)

(73) Assignee: FUTEK ADVANCED SENSOR TECHNOLOGY, INC., Irvine, CA (US)

( * ) Notice: Subject to any disclaimer, the term of this patent is extended or adjusted under 35 U.S.C. 154(b) by 89 days.

(21) Appl. No.: 14/081,255

(22) Filed: Nov. 15, 2013

(65) Prior Publication Data

US 2015/0135855 A1     May 21, 2015

(51) Int. Cl.
| | |
|---|---|
| *G01L 3/00* | (2006.01) |
| *G01L 3/14* | (2006.01) |
| *F16D 1/04* | (2006.01) |
| *F16D 1/08* | (2006.01) |
| *F16H 55/36* | (2006.01) |

(52) U.S. Cl.
CPC ... *G01L 3/14* (2013.01); *F16D 1/04* (2013.01); *F16D 1/0876* (2013.01); *F16H 55/36* (2013.01); *Y10T 403/7018* (2015.01)

(58) Field of Classification Search
CPC ........... F16D 1/0876; F16D 1/04; G01L 3/14; E05B 47/004; F16H 55/36
USPC ............................. 73/760, 779, 862.08, 856
See application file for complete search history.

(56) References Cited

U.S. PATENT DOCUMENTS

| | | | | |
|---|---|---|---|---|
| 3,661,023 | A * | 5/1972 | Maurey | 474/33 |
| 3,924,426 | A * | 12/1975 | Zane et al. | 70/18 |
| 4,917,526 | A * | 4/1990 | Paterson | 403/79 |
| 4,925,197 | A * | 5/1990 | Jones, Jr. | 280/32.6 |
| 6,417,768 | B2 * | 7/2002 | Osterman et al. | 340/479 |
| 7,334,776 | B2 * | 2/2008 | Kazerooni | 254/270 |
| 7,392,673 | B2 * | 7/2008 | Fawcett et al. | 70/14 |

* cited by examiner

*Primary Examiner* — Max Noori  
(74) *Attorney, Agent, or Firm* — Young Basile Hanlon & MacFarlane, P.C.

(57) ABSTRACT

Two forms of load bearing or transmitting structures are disclosed wherein each uses magnetism to hold a key in one of two bodies to prevent movement therebetween. One embodiment is a clevis, wherein the clevis pin is instrumented as a load cell and a magnetic key resides in a slot in a portion of the clevis pin which protrudes outside of one of the clevis legs. In another embodiment, torque is transmitted between a shaft and a coupling by means of keys that are held in keyways by magnetism thereby to provide a torque coupling between the shaft and coupling members.

6 Claims, 5 Drawing Sheets

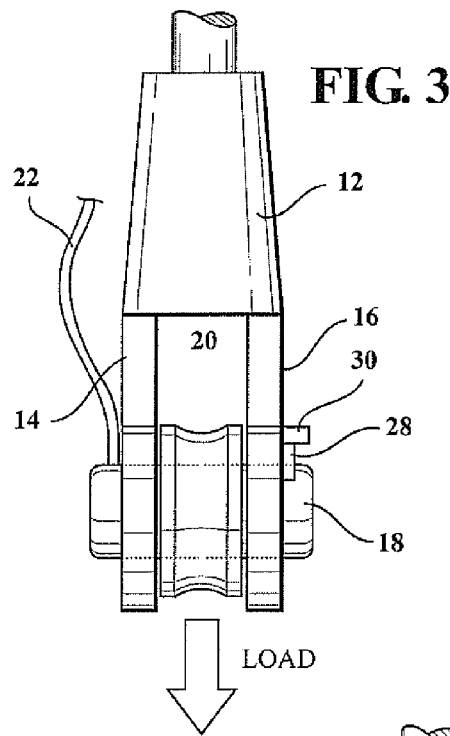
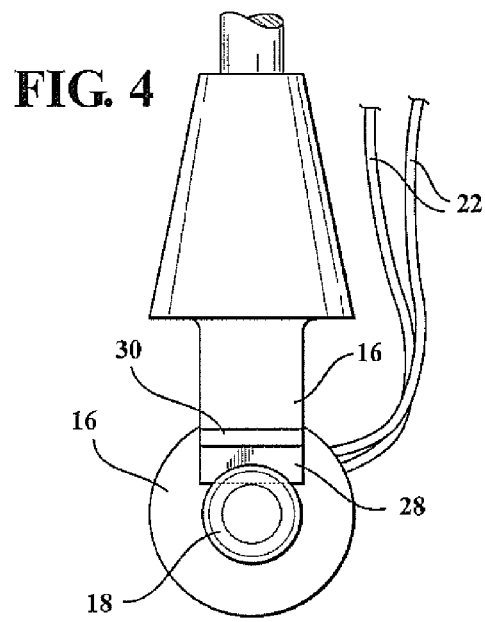
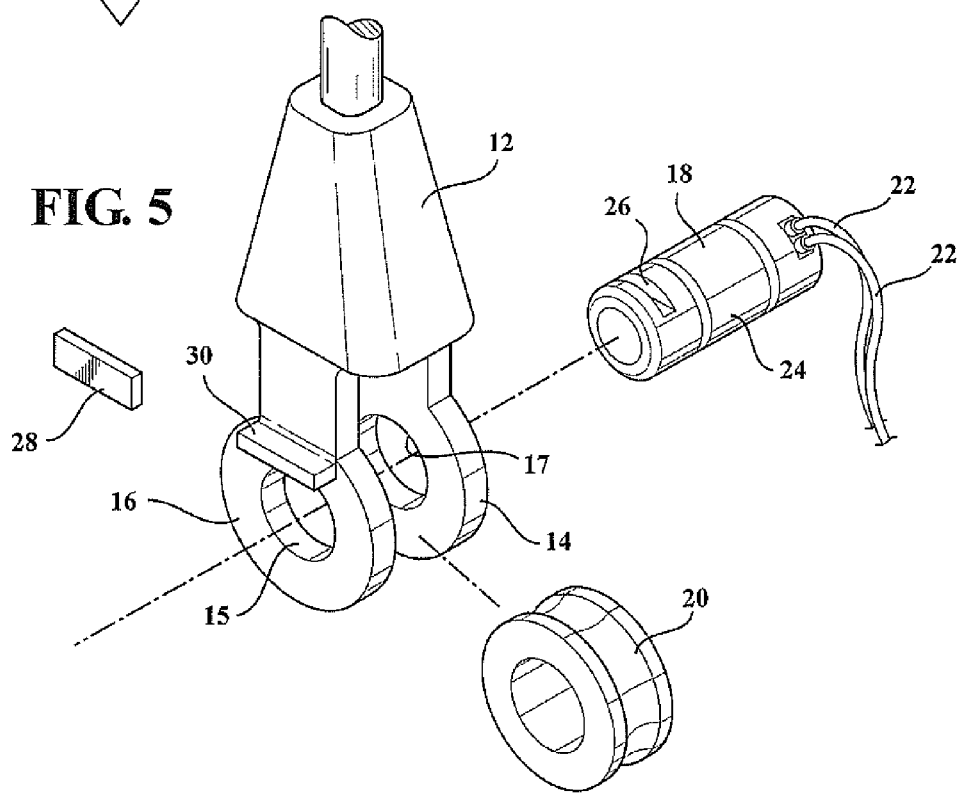

US 9,267,856 B2

LOAD AND TORQUE SENSING SYSTEMS UTILIZING MAGNETIC KEY FOR MECHANICAL ENGAGEMENT

FIELD OF THE INVENTION

The invention relates to mechanical assemblies for force and torque-sensing applications and more particularly to the use of a magnetic linking component such as a key to couple or connect two components of such an assembly.

BACKGROUND OF THE INVENTION

There are numerous mechanical assemblies for bearing or transmitting forces where it is necessary to establish and maintain a physical relationship between two associated components by means of a third "locking" component such as a key or pin. As one example, a clevis pin is often held in place between the two legs of a clevis by means of a Cotter pin. The Cotter pin prevents the clevis pin from moving relative to the clevis or shackle. As another example, a shaft may be coupled to another shaft or a collar by means of a key or set of keys. Here, the key prevents relative rotational movement of the two components it "locks" together. In both of these examples, the third component; i.e., the Cotter pin or the key, is held in place either by a friction fit or by mechanical deformation after being set in place. In either case, disassembly of the system typically requires the use of tools and often requires replacement of the locking component, particularly if the system is reassembled numerous times. This disadvantage is particularly significant in the case of load and torque sensing systems used either in a design process or in a monitoring role where disassembly is frequent and/or components are fragile and/or expensive.

SUMMARY OF THE INVENTION

The present invention facilitates the assembly and disassembly of load and torque bearing and/or transmitting assemblies by eliminating the need for wedge-fit or friction fit keys, Cotter pins and other components that must be forcibly driven into place and/or deformed to stay in place. In general, this is accomplished by providing a locking element that is held in place by magnetism, wherein the locking element or "key" fits between critical surfaces of two components to prevent relative movement between them along or about at least one axis or "degree of freedom". The term "key" as used herein, shall be construed to refer to a locking element having any of several physical configurations; e.g., it may be a bar, block, rod or a pin.

In one embodiment, hereinafter described in detail, a clevis pin used to support a pulley is held in place spanning the gap between the two legs of a clevis or shackle by means of a magnetic key that fits into a slot in one end of the clevis pin just outside of the clevis leg. The key prevents axial movement of the clevis pin in either direction. It can also be arranged to prevent rotation of the clevis pin as well.

In another embodiment, a torque coupling between a drive shaft and a driven shaft or collar is established and maintained by means of one or more magnetic keys that fit into matching slots formed in the two connected elements. The key or keys prevent relative movement between the two "locked" elements, allowing torque to be transmitted between the connected elements. The magnetic pins are easily removed.

In both cases, the assembly may include force and torque sensing instrumentation for testing or monitoring purposes. The magnetically secured key or keys facilitate disassembly and re-use.

Other advantages, features and characteristics of the present invention, as well as methods of operation and functions of the related elements of the structure, and the combination of parts and economies of manufacture, will become more apparent upon consideration of the following detailed description and the appended claims with reference to the accompanying drawings, the latter being briefly described hereinafter.

BRIEF SUMMARY OF THE DRAWINGS

The description herein makes reference to the accompanying drawings wherein like reference numerals refer to like parts throughout the several views and wherein:

FIG. 3 is an end view of the embodiment of FIG. 1;

FIG. 4 is a side view of the embodiment of FIG. 1;

FIG. 5 is an exploded view, in perspective, of the embodiment of FIG. 1;

DETAILED DESCRIPTION OF THE ILLUSTRATIVE EMBODIMENTS

Figure 1:
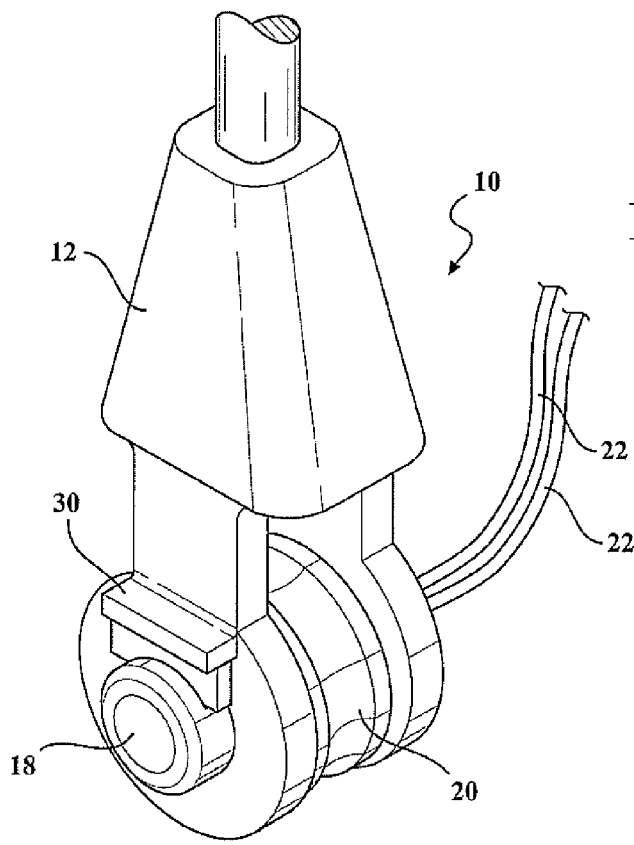
FIG. 1 is a perspective view of an embodiment of the invention in a clevis structure wherein the clevis pin is instrumental as a load cell.
Figure 2:
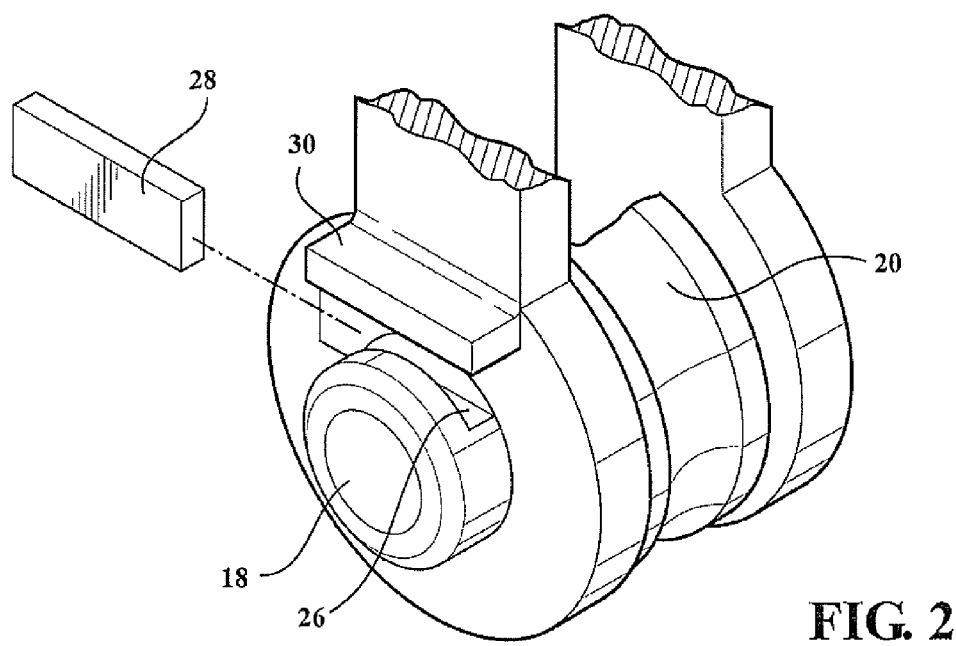
FIG. 2 is a detail of the magnetic key attachment structure.

Referring to FIGS. 1-5, there is shown a clevis structure 10, sometimes called a "shackle", of the type typically used as a pulley to carry a vertical load. It can also be used to anchor a rod or cable. The structure 10 comprises the clevis body 12 having spaced apart, parallel legs 14, 16, the larger lower circular portions of which are drilled out to exhibit holes 15, 17 that are coaxial and equal in diameter. An instrumented clevis pin 18 slides into and through the holes 15, 17 and is axially long enough to extend beyond the outsides of both of the clevis legs 14, 16 as best shown in FIG. 3. The clevis pin 18 is instrumented as a load cell of a known type, which cell generates electrical signals representing vertical load as a function of bending in the pin 18. These signals are connected by wires 22 to a recording and/or analytical system, such as a computer (not shown). A pulley 20 is mounted on the smooth center portion 24 of the clevis pin 18 for rotation relative thereto. Note, in FIG. 3 that the pulley 20 has clearance relative to both of the inside surfaces of the clevis legs 14, 16 for free rotation. A load is applied to the pulley by means of a rope, chain or cable and the top of the body 12 is supported or suspended in any of a variety of known manners as necessary to carry the load imposed by the rope, chain or cable around the groove in the pulley 20.

A transverse slot 26 is formed near one end of the clevis pin 18. The slot 26 is approximately half of a radius deep into the clevis pin and exhibits a flat bottom surface and parallel sides, thereby to receive a rectangular magnetic key 28 therein. A shoulder 30 is formed on the leg 16 of the clevis 12 just above the seat to provide an anti-rotation function such that the key 28 remains firmly in place between the base of the slot 26 and the undersurface of the shoulder 30 as best shown in FIG. 4.

In order for the key 28 to maintain its desired position where it prevents axial movement of pin 18 relative to the clevis 12, the pin 18 is made of a ferromagnetic material such that the key 28 is strongly attracted thereto. The clevis body 12 is also made of a ferromagnetic material, so the magnetic attraction of the key thereto prevents axial movement of the pin. Alternatively, a head may be formed on the end of pin 18 at the right end as shown in FIG. 3. The length of the key 28 is greater than the width of the seat 26 and approximately the same as the shoulder 30 as shown in FIG. 4. In the preferred case, the fit for the key 28 between the base of the slot 26 and the underside of the shoulder 30 is such that no tools are necessary to drive the key into place or to deform the key in the process of inserting it. Therefore, where, as shown here, the structure is used for load monitoring and/or testing purposes, and may be frequently disassembled and reassembled, it is a simple matter to remove the key 28 and pull the pin 18 from the clevis after removing any load on the pulley 20.

A second embodiment in a torque transmitting application is shown in FIGS. 6-9.

Figure 6:
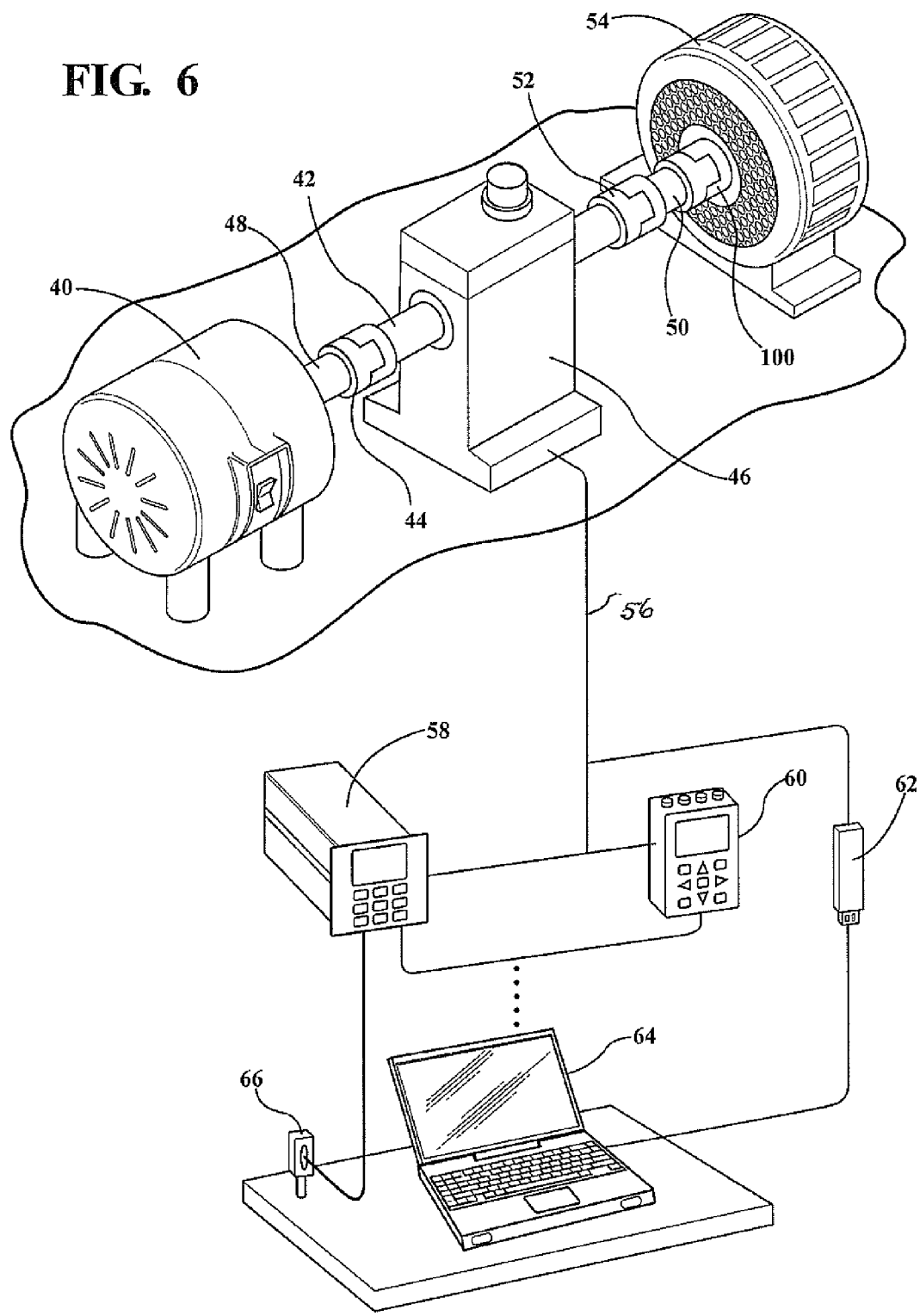
FIG. 6 is a perspective view of a system for measuring torque transmitted from an electric motor to an eddy-current brake.

Referring to FIG. 6, there is shown an assembly for measuring the torque delivered by an electric motor 40 to an eddy-current brake 54 or other load through a torque sensor 46 which comprises an instrumented shaft 42 extending through the torque sensor housing to transmit and measure the torque load. The torque sensor (reaction or rotary) 46 can be a commercially available torque sensor such as FUTEK TRS torque sensor 46 to take signals from the instrumented shaft via cable 56 for use by an electronics system comprising any or all of a digital display 58, a hand-held display 60, a computer 64 (via USB port 62) or other commercially available sensor instrumentation. The motor 40 has an output shaft 48 connected to one end of shaft 42 by a two-part coupling 44. Brake 54 has an input shaft 50 connected to the other end of shaft 42 by couplings 52 and 100. It is the manner in which shaft 42 is linked to the couplings 44, 52 for torque transmission that forms the focus of this description. Coupling 52 is used as the foundation for the following description, it being understood that it can be representative of coupling 44 as well.

Figure 7:
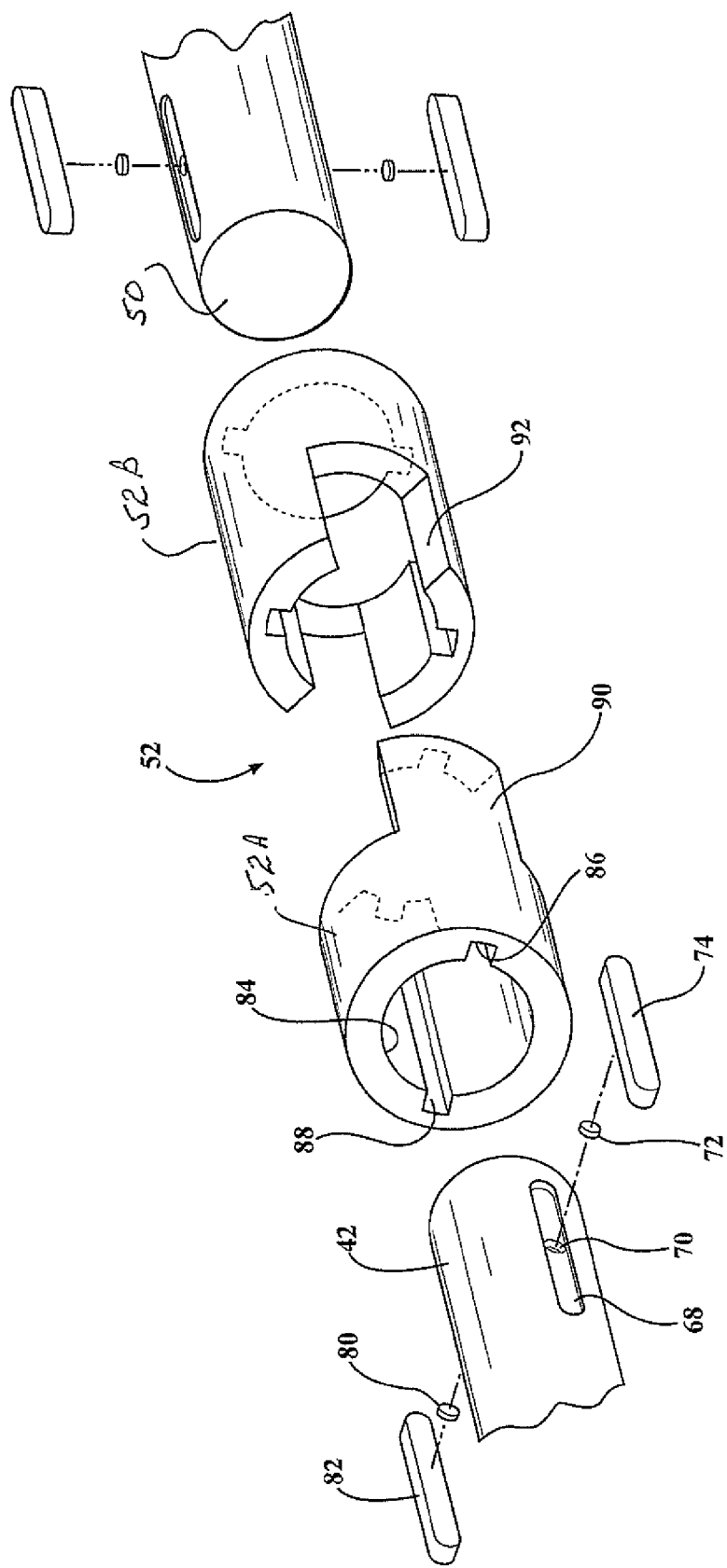
FIG. 7 is an exploded view of a representative coupling in the system of FIG. 6.
Figure 8:
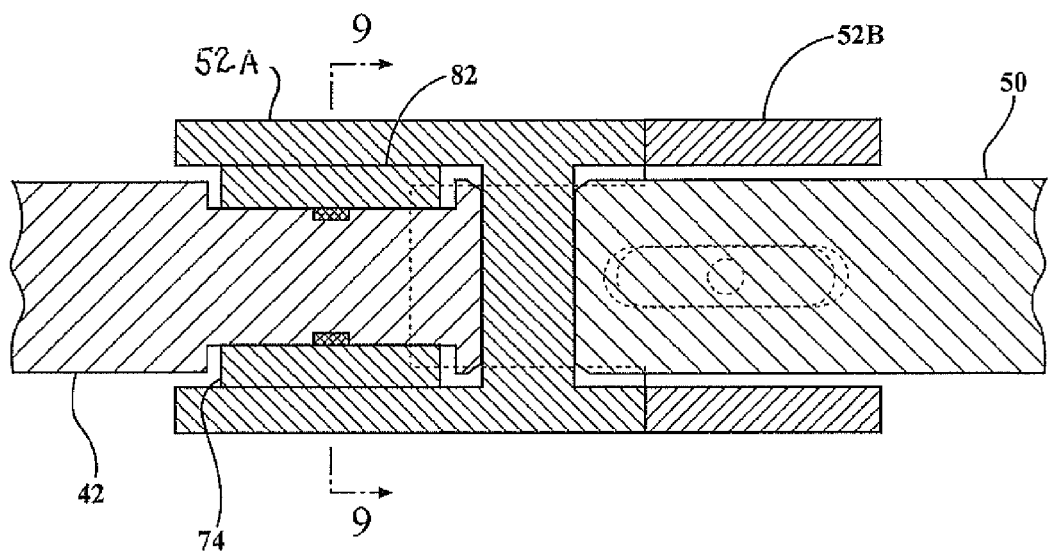
FIG. 8 is a sectional view of the coupling of FIG. 7.
Figure 9:
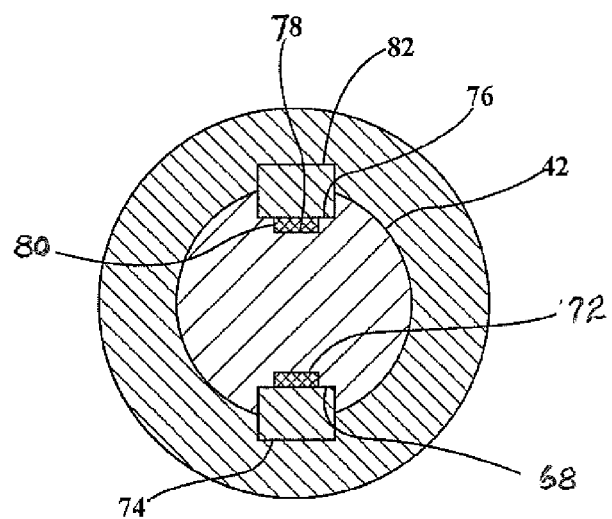
FIG. 9 is a sectional view through the section fine shown in FIG. 8.

Referring now to FIGS. 7, 8 and 9, the torque sensor shaft 42 on the right hand side of the torque sensor 46, as seen in FIG. 6, is linked to the eddy-current brake input shaft 50 by a coupling 52 which can be made in two parts for easy assembly and disassembly of the system. Shaft 42 is joined for torque transmission to the left side of the coupling 52 in the manner described below.

Shaft 42 has formed in the exterior cylindrical surface thereof an elongate axial groove 68 of uniform depth and having closed ends. The groove 68 is readily formed by a conventional machine tool. Formed centrally in the floor of the groove 68 is a small circular cavity 70 which is sized and configured to receive a coin-shaped magnet 72 of such height as to locate the top of the magnet flush with the floor of the groove 68. The assembly further comprises an elongate key 74 made of a ferromagnetic material which fits within the groove 68 lengthwise so as to be trapped axially by the closed ends of the groove 68. The height of the key 74 is greater than depth of the groove 68 such that approximately half of the key extends above, that is, radially beyond the outer surface of the shaft 42. Magnet 72 produces flux that passes through the shaft and the key and holds the key 74 in the groove. Therefore, the fit between key 74 and groove 68 need not be so tight as to require force to fit the key into the groove. Accordingly, the key is easily removed from the groove.

A second groove or keyway 76 may be formed in the top of the shaft 42 as shown in FIGS. 8 and 9. An additional cavity 78 is, in such a case, formed in the floor of the groove to receive a coin-shaped magnet 80 which holds an elongate key 82 in the groove 78 in essentially the same manner as the key 74 is held into the groove 78. It will be noted that the shaft grooves 68, 76 are closed-ended so as to prevent axial sliding of the keys 74 and 82 in either axial direction.

As will be apparent to those skilled in the art, the shaft 42, and the keys 78, 82 are made of a ferromagnetic material so as to exhibit the desired magnetic effect as well as the stiffness and strength to transmit the required amount of torque between the shaft 42 and a shaft 50. Shaft 50 may be joined to the right side of coupling 52 in any fashion, including magnetic keys and keyways as described above. As an alternative, the keys 74, 82 may be magnetized so as to eliminate the need for magnets 72, 80.

Referring again to FIGS. 6, 7 and 8, the coupling 52 comprises two parts, 52A and 52B which fit into one another by means of two tongues 90 on the part 52A and two complemental slots or grooves 92 in the part 52B. It will be understood that there are two such tongue and slot formations albeit only one of the tongues is evident in FIG. 7. This tongue and groove arrangement allows the two parts of the coupling to be easily separated from one another for assembly and disassembly in FIG. 6. Obviously, where appropriate, a single part coupling can also be used.

The coupling part 52A has a through-bore 84 which is sized so as to receive therein the shaft 42 to an axial depth sufficient to place at least part of the keyway groove 68 well within the coupling 52A. Radial keyways 86, 88 are formed 180° apart in the inner surface of the bore 84 to receive the radially outwardly extending head portions of the keys 74, 82 when the shaft containing the keys 74, 82, held in place by the magnet 72 and 80 into the bore 84. Shaft 50 is coupled to coupling 52B in the same way shaft 42 is connected to coupling 52A.

In the fashion described above, torque, whether dynamic or static, can be transmitted from shaft 42 to section 50 through the coupling 52 by way of the radially outwardly extending keys in their respective keyways. Disassembly is facilitated simply by withdrawing the shafts from the coupling portions and, where appropriate, removing the ferromagnetic keys from the keyway grooves.

In both of the embodiments used for illustration herein, a key is held in a key-receiving slot, groove or other position in a first component to prevent movement of that component relative to another component along or about at least one axis. In both cases, the key is held in this "locking" position entirely or substantially entirely by magnetism.

While the invention has been described in connection with what is presently considered to be the most practical and preferred embodiment, it is to be understood that the invention is not to be limited to the disclosed embodiments but, on the contrary, is intended to cover various modifications and equivalent arrangements included within the spirit and scope of the appended claims, which scope is to be accorded the broadest interpretation so as to encompass all such modifications and equivalent structures as is permitted under the law.

What is claimed is:

1. A force transmitting mechanical system comprising:
   a first body;
   a second body configured to be fitted into said first body for relative movement thereabouts;
   at least one of said bodies being made of a ferromagnetic material;
   a ferromagnetic coupling key; and
   at least one of said bodies being configured to define a keyway for receiving and holding said ferromagnetic key by magnetic force in a location that couples said bodies through said key and prevents relative movement therebetween.

2. Apparatus for transmitting a force in a mechanical system comprising:

a ferromagnetic shaft;

a body configured to receive such shaft in telescopic relationship therein;

a key comprising an elongate body of ferromagnetic material, and said shaft and said body being configured so as to define, in combination, a keyway conforming in size and configuration to said key so as to receive and hold said key by magnetic force whereby torque may be transmitted between said shaft and said body through said key only when said key is in said keyway.

3. The apparatus described in claim 2 wherein the second body is a clevis body having a pair of spaced apart, parallel legs defining parallel coaxial through holes, said shaft being located in said coaxial through holes.

4. The apparatus of claim 3 wherein said shaft is a clevis pin and said keyway comprising in part a transverse slot formed therein which slot, when the clevis pin is mounted in the clevis body, lies immediately adjacent one of the legs of the clevis body and is configured to receive said key therein.

5. The apparatus described in claim 4 wherein the key way comprises in part a shoulder formed on a surface of one of the clevis body legs immediately above the key when inserted in said keyway to prevent rotation thereof.

6. The apparatus as defined in claim 5 wherein the clevis pin is instrumented as a load cell.

\* \* \* \* \*